Figure 2:
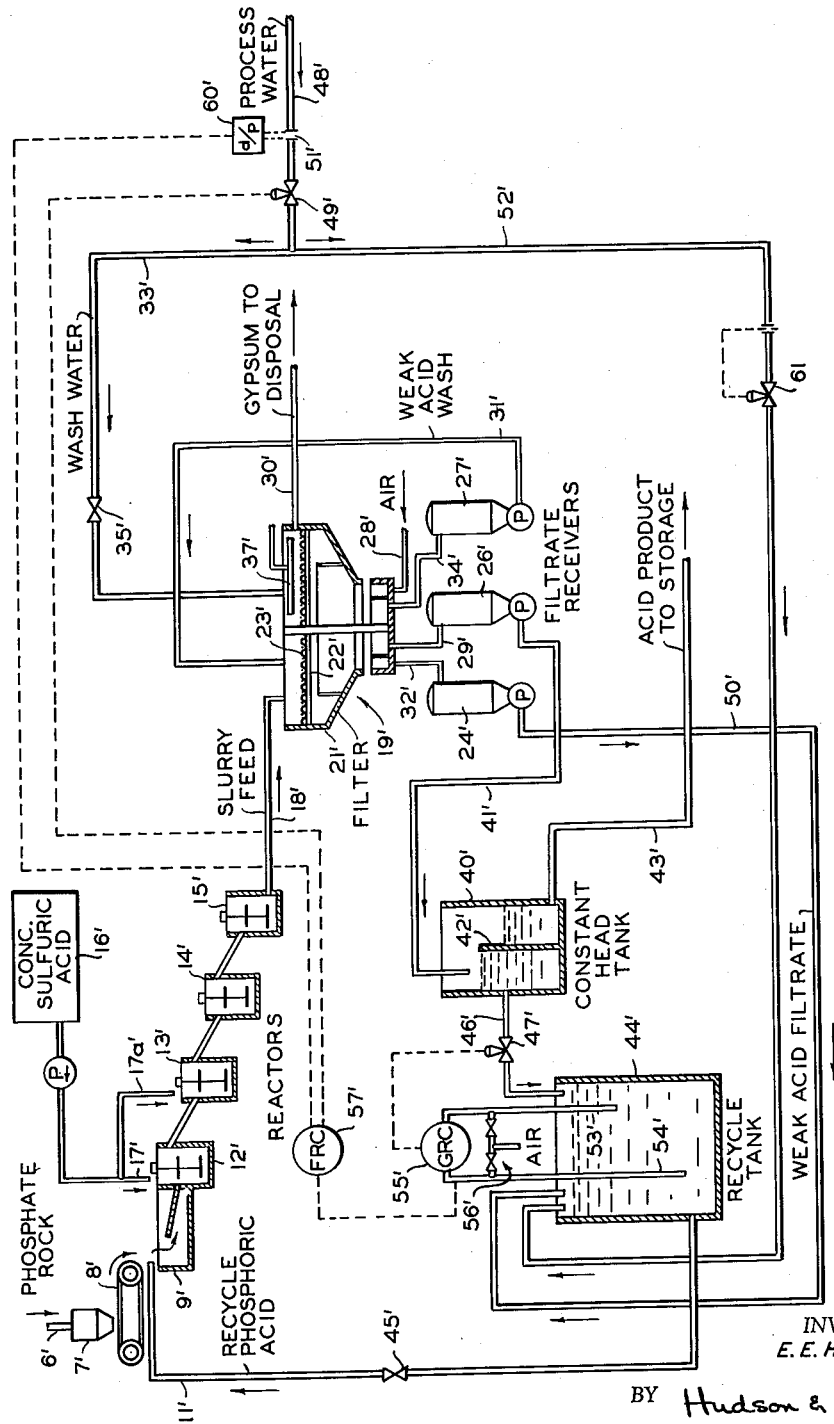

Jan. 16, 1962  E. E. HUXLEY  3,017,247
MANUFACTURE OF PHOSPHORIC ACID
Filed Feb. 11, 1957  2 Sheets-Sheet 1

FIG. I.

INVENTOR.
E. E. HUXLEY
BY Hudson & Young
ATTORNEYS

INVENTOR.
E. E. HUXLEY

United States Patent Office 3,017,247
Patented Jan. 16, 1962

3,017,247
MANUFACTURE OF PHOSPHORIC ACID
Edward E. Huxley, Pasadena, Tex., assignor to Phillips Petroleum Company, a corporation of Delaware
Filed Feb. 11, 1957, Ser. No. 639,256
2 Claims. (Cl. 23—165)

This invention relates to the manufacture of phosphoric acid. In one aspect it relates to a process and apparatus for automatically maintaining the specific gravity of a liquid obtained by filtering a slurry. More particularly, it relates to a process and apparatus for automatically maintaining the specific gravity of recycle phosphoric acid which is initially reacted with the phosphatic material utilized in the manufacture of phosphoric acid by the wet process.

Many processes have been suggested, patented, or employed in the past for the manufacture of phosphoric acid. The so-called wet process for producing phosphoric acid has been extensively used because of its simplicity and economic operation. According to this process, phosphate rock is treated in a series of reactors with sulfuric acid to produce a slurry of soluble phosphoric acid and insoluble calcium sulfate. The slurry is then filtered and washed and the resulting phosphoric acid filtrate may then be concentrated for the production of triple superphosphate or other phosphatic fertilizer material. The insoluble calcium sulfate (gypsum) is usually reslurried with salt water and pumped to a spoil pond for disposal.

It has been recently discovered that it is advantageous to initially react the phosphatic material with recycle phosphoric acid. For optimum efficiency of the acid manufacturing process, it is necessary to maintain the specific gravity of this recycle acid as constant as possible. When the specific gravity of the recycle acid is allowed to vary over a wide range, the reactors tend to produce non-uniform filter feed slurry which is difficult to filter and which forms a filter cake that is difficult to wash to a low, water-soluble $P_2O_5$ content. The varying specific gravity also makes it necessary to vary over a wide range of rate the amount of process water employed as filter wash water. Large changes in the amount of process water causes undesirably high losses of $P_2O_5$.

It was the practice heretofore to manually control the specific gravity of the recycle acid. According to one conventional method of controlling the specific gravity, samples of the recycle acid were taken continuously from the recycle tank and specific gravity determinations made. When it was found that the specific gravity was lower than that desired, it was necessary to increase the ratio of strong acid filtrate fed to the recycle tank to that of water sent directly to the filtration zone. This meant that the flow of water to the system had to be decreased slightly and the flow of strong acid filtrate to the recycle tank had to be increased slightly. When the specific gravity of the recycle acid was found to be undesirably high, according to the conventional method, the amount of process water sent to the filtration zone was increased if this could be done without flooding the filtration zone, and the amount of strong filtrate sent to the recycle tank was decreased.

When the level in the recycle tank was falling, the conventional operation was to increase the rate of water sent to the system and increase the rate of strong acid filtrate added to the recycle tank in proportion to the increase in water rate. When the level in the recycle tank was falling, the rate of water sent to the system was increased and the flow of strong acid filtrate sent to the recycle tank was decreased.

Thus, this conventional operation meant that in order for the specific gravity of the recycle acid to be held constant, the specific gravity of the recycle acid had to be repeatedly determined, together with the liquid level in the recycle tank, and changes in the rate of addition of the strong acid filtrate to the recycle tank had to be made at the same time changes in the rate of addition of water to the system were made.

Accordingly, the applicant has found by actual experience over a long period of time that even under best operating conditions, the manual control or maintenance of the specific gravity of the recycle acid could not maintain the necessary control of the specific gravity to produce a good filter feed slurry necessary for economic and efficient operation of the acid manufacturing process.

Accordingly, an object of this invention is to automatically maintain the specific gravity of a liquid obtained by filtering a slurry or the like. Another object is to provide an improved process and apparatus for the economic manufacture of phosphoric acid by the wet process. Another object is to provide an improved process and apparatus in the phosphoric wet process whereby the amount of available $P_2O_5$ lost in discarded gypsum is reduced.

Other objects and advantages of my invention will become apparent from the following discussion, appended claims, and the accompanying drawing in which FIGURES 1 and 2 diagrammatically represent systems for treating the raw materials to produce the desired product according to the present invention.

By convention, the phosphorous content of any type of phosphatic fertilizer is expressed as phosphoric anhydride ($P_2O_5$). Most commonly, the term phosphoric acid is used to denote the $P_2O_5$ content. The difference between the total $P_2O_5$ content of a fertilizer and a fraction that is insoluble in ammonium citrate solution is the portion caused to be available for use of the plant and hence is termed available $P_2O_5$ or available phosphoric acid. In the fertilizer trade, it has long been the custom to express the quantity of phosphate rock in terms of tricalcium phosphate, since tricalcium phosphate is seldom, if ever, found in phosphate rock as such.

Referring to the drawing now, and to FIGURE 1 in particular, finely divided phosphate rock, such as apatite rock, is transferred from a storage silo (not shown) by line 6 to fine rock hopper 7. The rock is accurately weighed and conveyed at a constant rate from hopper 7 by a conveyor belt 8 to a trough 9 where it is initially reacted with recycle phosphoric acid supplied at a constant rate thereto via line 11. Alternatively, a mixing tank or the like can be employed in place of trough 9.

The recycle acid, preferably having a specific gravity about 1.2, serves the following purposes: to initially react with the rock; to furnish water to the process necessary to dilute the phosphoric acid formed in the reactors to a specific gravity of about 1.3; to form a gypsum slurry; and to provide water for evaporation to cool the reactors.

For a given rock rate, the recycle rate of this acid is held constant; this rate controls the percent of solids in the last reactor in which the solids content is preferably held at about 25 percent. The specific gravity of this recycle acid is used to control the specific gravity in the last reactor.

The wetted rock is allowed to flow after a few seconds into the first of a series of four reaction tanks or reactors 12, 13, 14, 15 which are provided with suitable agitation means and preferably enclosed and fabricated from carbon steel lined with rubber and acid proof brick.

The wetted rock is mixed and partially reacted with sulfuric acid in the first reactor 12, the acid being supplied at a constant rate from storage tank 16 via line 17. The resulting mixture then overflows into reactor 13 where additional sulfuric acid is added via line 17a. An excess of sulfuric acid is preferably used so that there will be present in the last reactor 15 about 1.5 to 2.5 percent of free sulfuric acid to prevent the formation of a slimy filter cake. The rock slurry mixture then overflows into reactor 14 and from there into the last reactor 15. Additional sulfuric acid can be added to these reactors 14, 15, if necessary. The reactors are in series to provide sufficient retention time (e.g., 2 hours) for the reaction to go to completion and form phosphoric acid and gypsum. Obviously, I do not intend to limit my invention to the use of four reactors but intend to include the use of one or more, and preferably four, reactors as shown.

The reaction between sulfur acid and phosphate rock is exothermic and considerable quantities of heat are liberated by this reaction, as well as from the dilution of the concentrated sulfuric acid—the latter being initially diluted by the recycle phosphoric acid to a concentration of about 93 percent. The first reactor 12 is preferably air cooled to a temperature in the range of about 195–200° F., and reactors 13 and 14 are air cooled to hold the temperature in the last reactor to about 170° F. The fumes and steam evolving from the reaction are carried away by suitable means to fume scrubbers or the like.

The filter feed discharged from the last reactor 15 is a slurry of gypsum particles in water and phosphoric acid. About ⅔ of the phosphoric acid, $P_2O_5$, in the last reactor 15 comes from the recycle acid line 11 and about ⅓ is produced in the reaction of the phosphate rock. There are also various impurities dissolved in the phosphoric acid, such as the phosphates of iron and aluminum, various fluorides and silica compounds.

The filterability of the slurry discharged from reactor 15 is affected, among other things, by the recycle acid rate and specific gravity of the recycle acid; therefore, it is necessary that these factors be accurately controlled if the loss of available $P_2O_5$ is to be minimized.

The filter feed overflows from reactor 15 to one or more filters via distributor 18. In the interest of simplicity and to avoid prolixity, only one filter is shown, generally designated 19, and is preferably a horizontal vacuum filter of the Oliver type. It is to be understood that I do not intend to limit the practice of my invention to any particular type of vacuum filter. Although I prefer to employ a plurality of vacuum filters, e.g., three, actually one filter could be used if the filtrate pumps are large enough to handle all of the filtrate from the slurry.

The main body of filter 19, shown schematically in the drawing, consists of a large pan 21 mounted on a rotating turn-table (not shown). Filter supports 22 divide the filter into a plurality of sectors. A filter cloth 23 made of Saran, for example, is stretched tight and caulked in place forming a false bottom for the pan 21. Supports 22 serve as partitions to separate the space under the cloth 23 into four individual compartments, for example, each connected with its own outlet or inlet conduit. As the filter pan 21 rotates the slurry passes over the openings to conduits leading to three filtrate receivers 24, 26, and 27, and one section of the pan 21 is at all times over the inlet of a conduit 28 supplying compressed air; thus, during one revolution all sections of the pan 21 are connected to each of these four conduits during a part of the pan revolution.

A vacuum pump (not shown) connected to the tops of the filtrate receivers 24, 26 and 27, through suitable moisture and filtrate traps, pulls a vacuum on the receivers and the compartments under the filtrate cloth 23.

To describe the operation of the filter 19, one of the sectors of the pan 21 will be traced through one revolution.

At the beginning of the revolution the pan sector passes under the outlet of the slurry distributor line 18 where the slurry feed is fed over the surface of the filter cloth on what is called the strong filtrate section of the filter. Here as much of the undiluted phosphoric acid as possible is pulled from the deposited filter cake of gypsum by a vacuum. The filtrate obtained, known as the "strong acid" filtrate, passes through the filter cloth and flows into the compartment underneath into a first filtrate receiver 26 via line 29. This filtrate, the product of the process, preferably has a specific gravity of about 1.30. Generally only a major portion of the strong filtrate (e.g., 70 percent) will be obtained in this section, the minor portion remaining in the filter cake as residual strong filtrate; thus, the amount of acid remaining in the filter cake will be about equal to the acid that was produced in the reactors during, for example, one minute of operation. The acid that was produced during this short period of operation must be either recovered from the filter cake or lost when the cake is sent to the spoil pond.

The residual strong acid filtrate is recovered as follows. After each sector passes the opening to the first filtrate receiver 26, it passes into what is called the first weak filtrate wash section where it comes into contact with the opening to the second filtrate receiver 24. Here a wash, called a "weak wash filtrate," can be supplied via line 31 and sprayed over the filter cake, pushing most of the residual acid from the filter cake. The filtrate obtained, known as the "first weak acid filtrate," is drained through line 32 to the second filtrate receiver 24. This washing step is very important since by it most of the residual strong acid is recovered. However, usually about ⅓ of the residual strong acid will still be retained by the filter cake and must be recovered.

The pan sector passes to what is called the second weak acid filtrate wash section where it comes under headers of wash water supplied via line 33, provided with valve 35. This water is relatively hot, about 170° F., and is sprayed over the filter cake to displace any residual acid remaining in the cake after the first washing step. The filtrate obtained, known as the "second weak acid filtrate," is drained into the third filtrate receiver 27 via line 34. A portion or all of this filtrate is pumped back to the first weak acid filtrate wash section via line 31 where it is used for the first washing as described above. The specific gravity of this filtrate is preferably in the range of 1.05 to 1.08.

The maximum amount of wash water that can be used to wash the filter cake at any given rock rate and recycle acid rate is fixed by the amount of water used in the reactors, assuming the specific gravity and amount of available recycle acid is constant. This is the reason why it is usually necessary to use the second weak acid filtrate as a washing medium to bring about the initial displacement of residual acid remaining in the filter cake. Also, the maximum amount of water that can be sprayed on the filter cake is often limited by the characteristics of the filter cake itself; if the cake contains a large amount of very fine gypsum particles, it is often difficult to separate all the acid from the cake since the water wash (and weak acid wash) can't readily pass through the cake and the amount used must be decreased in order to prevent the filter from operating as a revolving "bird bath," flooded from rim to rim. According to this invention, the operator need only monitor valve 35, allowing as much of the available water as possible to be sprayed over the filter cake without flooding the filters.

After the water washing step, the pan sector passes on to the cake removal section where it comes in contact with a stationary blade that cuts the top portion of the cake off the filter. A rotating reel 37 rakes the top portion over the stationary blade into a launder or onto a belt where it is discharged via line 30 to a spoil pond. The heel or lower portion of the cake, about ¼ inch, remains on the filter cloth and passes back to the strong acid filtrate section where the filter cycle is repeated. Snap air is blown upward through the filter cloth and loosens the heel from the cloth so that it may be reslurried with the incoming fresh filter feed. The temperature of the snap air should be maintained about 170° F., preferably by means of steam, in order to prevent cooling the acid below 170° F.

The strong acid filtrate is pumped from filtrate receiver 26 to a constant head tank 40 via line 41. Tank 40 is provided with an upright partition 42 so as to maintain a constant head and the strong acid filtrate which overflows this partition is conveyed via line 43 to storage where it is stored as a dilute phosphoric acid product having a specific gravity of about 1.30 or 26 percent. This product can later be sent to concentrators where it is concentrated, for example, to 52 percent.

The strong acid filtrate flows into recycle tank 44 via line 46 at a rate controlled by valve 47. Recycle acid from tank 44 flows to trough 9 via line 11 at a constant rate controlled by valve 45. All of the first weak acid filtrate wash in receiver 24 can be pumped to recycle tank 44 via line 50, or a portion thereof can be used to wash the filter cake.

Process water is pumped and supplied to the process via line 48 at a rate controlled by valve 49. Downstream of the latter this water is conducted to the filter 19 via line 33. Some of the process water is conducted to the recycle tank 44 via line 52, depending on certain conditions to be described hereinafter. As such, the water supplied to these two points in the process comes from a common source or header, namely line 48. In the embodiment shown in FIGURE 1, that part of line 48 downstream of valve 49 is a substantially vertically inclined conduit, as is the major portion of line 52. Thus, with valve 35 opened as wide as possible in order to wash the filter cake with the maximum amount of the water supplied by the process water header 48 yet without flooding the filter 19, it will take a certain predetermined pressure in line 33 before water will flow into the recycle tank 44. This predetermined pressure will be dependent upon the flow rate of process water in line 48 as well as the flow rate of wash water in line 33, the latter flow rate being in turn dependent on the filterability of the gypsum filter cake. At certain times, this filterability will be such that all of the process water will be used to wash the filter cake and at other times some of this process water will in addition be conducted to recycle tank 44. From the foregoing, it is evident that all of the process water eventually is conducted to the recycle tank, except, of course, that amount of wash water which is retained by the filter cake and sent with the same to the spoil pond.

As stated hereinbefore, it is necessary to maintain at a constant value the specific gravity of the recycle acid which is initially reacted with the phosphate rock in trough 9; preferably it is maintained at about 1.30. Accordingly, the applicant discovered the present invention whereby the objects heretofore mentioned could be achieved and the amounts of available $P_2O_5$ heretofore lost could be minimized. The manner in which this was achieved will now be detailed, reference again being made to FIGURE 1.

Recycle tank 44 is provided with a pair of air tubes, one tube 53 being shorter than the other tube 54, depending in the recycle acid solution and open at their lower ends at different levels. The upper ends of these tubes 53, 54 are operatively connected to a gravity recorder controller 55, such as an air-operated Foxboro Model 41 Controller. A constant volume of air is supplied to each of tubes 53, 54 via air line generally designated 56 and this air bubbles from the lower ends of tubes 53, 54 into the recycle acid. The specific gravity of the recycle acid is directly proportioned to the differential pressure between tubes 53, 54 i.e., an increase in specific gravity increases the differential pressure and vice versa. As such, the gravity recorder controller 55 measures the differential pressure between these tubes. Initially, the gravity recorder controller 55 is set at that specific gravity of the recycle it is desired to maintain. Should the specific gravity of this recycle acid vary from the desired value, the change in differential pressure between the tubes 53, 54 will be sensed by the gravity recorder controller 55.

Motor valve 49 in process water header 48 is operatively connected by an air line to a flow recorder controller 57 (such as an air operated Foxboro Model 41 Controller), which can be operatively connected by an air line to gravity recorder controller 55. Process water line 48 is provided with an orifice 51 which is operatively connected to a differential pressure cell 60, or the like, whereby the flow in line 48 is measured; this measurement is transmitted to flow recorder controller 57. The latter transmits a signal to valve 49 proportional to signal sent from d/p cell 60 to flow recorder control 57. Flow recorder controller 57 is set so as to control by valve 49 the rate of process water necessary to maintain the specific gravity at its desired constant value. Should the differential pressure between tubes 53, 54 vary from the desired value, the air-output from gravity recorder controller 55 resets the flow recorder controller 57 which in turn will actuate motor valve 49 so as to maintain the rate of process water accordingly to maintain gravity control in recycle tank 44.

By way of illustration, assume that the flow recorder controller 57 is initially set so that about 6.5 g.p.m. of process water is used for each ton per hour of phosphate rock charge and that it can change the water rate of the process water by about plus or minus 10 g.p.m. And assume that the gravity recorder controller 55 is initially set to maintain the specific gravity of the recycle acid at 1.30 and that its air pressure output at this valve will be about 9 p.s.i.; also that this latter instrument is adapted to have an air pressure output that can vary from 3 to 15 p.s.i. Above 9 p.s.i. the gravity recorder controller 55 is calling for more water and the flow recorder controller 57 accordingly causes valve 49 to open wider; below 9 p.s.i., the gravity recorder controller 48 is calling for less process water and flow recorder controller 57 accordingly causes valve 49 to close somewhat. Of course, gravity recorder controller 55 and flow recorder controller 57 can be designed so that only signals falling within a certain range will be sensed and controlled without manually resetting these instruments; for example, the flow recorder controller may require resetting if the air pressure output from gravity recorder controller 55 is less than 3 p.s.i. or greater than 15 p.s.i. To aid the operator in determining whether such conditions exist, the air line between the two instruments can be fitted with a suitable pressure gage such as 58. Under normal operating conditions, it was found that the control system worked perfectly with little or no change of the instrument settings by the operator.

The level of the recycle acid in tank 44 is controlled, according to the practice of this invention, as follows, reference being again made to FIGURE 1. Operatively connected to motor valve 47 in line 46 is a liquid level indicator transmitter 59 which controls the former by an air line. This instrument is also operatively connected by an air line to the air tube 54. The air pressure in tube 54 is directly proportional to the head of the recycle acid in tank 44. Liquid level indicator transmitter 59 is initially set so that valve 47 controls the flow of strong acid filtrate to the recycle tank 44 at a rate necessary to maintain the liquid level of the recycle acid in this tank at a desired constant value; this instrument will sense the change and accordingly the valve 47 will change the rate of flow of strong acid filtrate to the recycle tank 44.

The instruments which automatically maintain the specific gravity of the recycle acid, according to this invention, operate together as follows. If the specific gravity of the recycle acid in tank 44 falls below the desired value, motor valve 49 closes somewhat causing the liquid level in tank 44 to fall accordingly whereby motor valve 47 opens wider with the overall result that the specific gravity of the recycle acid increases. If the specific gravity of the recycle acid increases, the motor valve 49 opens wider causing the liquid level in tank 44 to rise accordingly whereby motor valve 47 closes somewhat with the result that the specific gravity of the recycle acid decreases.

Reference will now be made to the embodiment of my invention illustrated in FIGURE 2, wherein parts corresponding to those of FIGURE 1 have been designated with like but primed reference numbers. The process of FIGURE 2 is the same as that of FIGURE 1 except that the means whereby the specific gravity of the recycle acid is maintained constant is modified.

In FIGURE 2, wherein structure corresponding to like structure of FIGURE 1 is designated with like but primed reference numbers, process water header 48' supplies water to branch lines 33' and 52'. These lines can be laid in the same or different horizontal planes. Line 52', which supplies process water to recycle tank 44', is provided with a back pressure valve 61 which is adapted to control the flow through line 52'. This valve 61 is set so as to open and permit flow of water to tank 44' when the pressure of water upstream thereof reaches a predetermined pressure, the latter being dependent on the extent to which motor valve 49' is open and the extent to which valve 35' is open, and the latter being in turn dependent on the filterability of the slurry.

In this embodiment, motor valve 47' is operatively connected to gravity recorder controller 55' and motor valve 49' is operatively connected to flow recorder controller 57', the latter in turn being operatively connected to the long air tube 54' and responsive to changes in liquid level. If the specific gravity of the recycle acid in tank 44' decreases, motor valve 47' is opened wider, increasing the flow of strong acid filtrate in line 46' to tank 44', whereby the level in the latter increases along with the specific gravity, causing the motor valve 49' to close somewhat thereby decreasing the flow of process water. If the specific gravity of the recycle acid increases, motor valve 47' is closed somewhat, decreasing the flow of strong acid filtrate to tank 44', whereby the level in the latter decreases along with the specific gravity, causing motor valve 49' to open wider thereby increasing the flow of process water.

Since it is desirable to use as much of the available process water as possible for washing the filter cake, back pressure valve 61 is set so as to only permit flow of process water to tank 44' when the filter 19' cannot take any more water without flooding or, in other words, when the pressure upstream of valve 61 reaches a predetermined value.

Although the instruments and valves 47, 49 are illustrated as being air-operated, it is, of course within the scope of this invention to electrically actuate these elements.

The present invention has been proven operable in a modern plant of commercial size and all of the aforementioned objects of this invention have been realized. The following table shows a comparison of the losses of available $P_2O_5$ before and after a commercial plant for the manufacture of phosphoric acid by the wet process was modified according to FIGURE 1 of this invention.

TABLE

*Weight percent of water soluble $P_2O_5$ lost by filters during a single month of operation of commercial plant*

| Conventional Operation (Before Installing invention) | | | | Improved Operation (After installing invention) | | | |
|---|---|---|---|---|---|---|---|
| Day of Operation | Filter | | | Day of Operation | Filter | | |
| | 1 | 2 | 3 | | 1 | 2 | 3 |
| 1 | 0.8 | 0.8 | 0.5 | 14 | 0.3 | 0.6 | 0.7 |
| 2 | 0.5 | 0.5 | 0.9 | 15 | 0.4 | 0.8 | 0.6 |
| 3 | 0.9 | 1.3 | 2.3 | 16 | ---- | 0.4 | 0.4 |
| 4 | 0.5 | 0.5 | 0.9 | 17 | 0.2 | 0.7 | 0.3 |
| 5 | 0.9 | 1.3 | 2.3 | 18 | ---- | 0.4 | ---- |
| 6 | 1.2 | 4.7 | 1.6 | 19 | 0.6 | 0.8 | 0.5 |
| 7 | 2.0 | ---- | 1.4 | 20 | 0.3 | 0.6 | 0.2 |
| 8 | 2.1 | ---- | 1.0 | 21 | 0.6 | 0.5 | 0.2 |
| 9 | 4.5 | 11.8 | 3.5 | 22 | 0.7 | 0.8 | 0.3 |
| 10 | 2.9 | ---- | 6.2 | 23 | 0.8 | ---- | 0.6 |
| 11 | 3.1 | 5.1 | ---- | 24 | 0.6 | 0.5 | 0.5 |
| 12 | 3.5 | 2.5 | 5.2 | 25 | 0.8 | 0.8 | 0.2 |
| 13 | 0.7 | 2.9 | 0.8 | 26 | 1.1 | 0.4 | 0.3 |
| | | | | 27 | 0.3 | 0.6 | 1.0 |
| | | | | 28 | 0.4 | 0.4 | 0.3 |
| Total Loss | 23.6 | 31.4 | 26.6 | | 7.1 | 8.3 | 6.7 |
| Average daily loss of all filters | 2.45 | | | | 0.54 | | |
| Tons $P_2O_5$ lost in 13 days @ 20 Tons/hr. rock rate [1] | 229 | | | | 54.5 | | |
| Value of loss $P_2O_5$ @ $100/Ton | $22,900 | | | | $5,450 | | |

[1] First 5 days rock rate was 14–16 tons/hr.—loss based on 20 tons/hr. for full month of operation, using apatite rock.

From the above table it is seen that when operating according to the conventional method of washing the filter cake and maintaining the specific gravity of the recycle acid, the daily discarded filter cake contained about 0.77 weight percent of available $P_2O_5$, whereas when operating according to my invention the daily discarded filter cake contained only 0.19 weight percent of available $P_2O_5$. Thus, in the course of 14 days' operation by the present invention about 175 tons or $17,450 of valuable available $P_2O_5$ were saved.

Various modifications and alterations will become apparent to those skilled in the art, without departing from the scope and spirit of this invention, and it is to be understood that the foregoing discussion and drawing only illustrate preferred embodiments of this invention and do not necessarily limit the same.

I claim:
1. In a continuous process for the production of phosphoric acid, including the steps of initially reacting phosphatic material with recycle phosphoric acid, reacting the resulting mass with concentrated sulfuric acid to obtain a slurry comprising dilute phosphoric acid and gypsum, filtering said slurry in a filtration zone to obtain a first filtrate comprising dilute phosphoric acid, washing said gypsum remaining in said filtration zone with a wash comprising a first portion of water to obtain a second filtrate comprising dilute phosphoric acid, conducting said first filtrate to a first zone, conducting said second filtrate to a second zone, conducting a second portion of water directly to said second zone, conducting a portion of said first filtrate from said first zone to said second zone, and continuously withdrawing the contents from said second zone and using the same as said recycle phosphoric acid, the improvement comprising supplying said first and second portions of water from a common source, conducting said water to said second zone when the flow rate of the water from said common source reaches a predetermined value which indicates that the flow rate of said first portion thereof will flood said filtration zone, automatically sensing changes in the specific gravity of said recycle phosphoric acid from that of a predetermined specific gravity value which produces a uniform feed slurry to said filtration zone, automatically sensing changes in the liquid level in said second zone from that of a predetermined liquid level value which indicates a constant head for said first filtrate in said first zone, and automatically controlling the amount of said water used in said process and the amount of said first filtrate conducted to said second zone in accordance with said changes.

2. In a continuous process for the production of phosphoric acid, including the steps of initially reacting phosphatic material with recycle phosphoric acid, reacting the resulting mass with concentrated sulfuric acid to obtain a slurry comprising dilute phosphoric acid and gypsum, filtering said slurry in a filtration zone to obtain a first filtrate comprising dilute phosphoric acid, washing said gypsum remaining in said filtration zone with a wash comprising dilute phosphoric acid obtained as subsequently described whereby a second filtrate is obtained comprising dilute phosphoric acid, washing said gypsum with a wash comprising a first portion of water to obtain as a filtrate that dilute phosphoric acid used to initially wash said gypsum, conducting said first filtrate to a first zone, conducting said second filtrate to a second zone, conducting a second portion of water directly to said second zone, conducting a portion of said first filtrate from said first zone to said second zone, and continuously withdrawing the contents from said second zone and using the same as said recycle phosphoric acid, the improvement comprising supplying said first and second portions of water from a common source, conducting said water to said second zone when the flow rate of the water from said common source reaches a predetermined value which indicates that the flow rate of said first portion thereof will flood said filtration zone, automatically sensing changes in the specific gravity of said recycle phosphoric acid from that of a predetermined specific gravity value which produces a uniform feed slurry to said filtration zone, automatically sensing changes in the liquid level in said second zone from that of a predetermined liquid level value which indicates a constant head for said first filtrate in said first zone, automatically controlling the amount of said water used in said process in accordance with said specific gravity changes, and automatically controlling the amount of said first filtrate conducted to said second zone in accordance with said liquid level changes.

References Cited in the file of this patent

UNITED STATES PATENTS

| | | |
|---|---|---|
| 1,944,048 | Walker et al. | Jan. 16, 1934 |
| 1,985,435 | Watson | Dec. 25, 1934 |
| 2,233,956 | Moore | Mar. 4, 1941 |
| 2,314,822 | Galainena y Quesada | Mar. 23, 1943 |
| 2,505,756 | De Koning | May 2, 1950 |
| 2,644,587 | Webster | July 7, 1953 |
| 2,710,247 | Knowles et al. | July 7, 1955 |
| 2,887,362 | Lee | May 19, 1959 |
| 2,917,380 | Franklin | Dec. 15, 1959 |